United States Patent
Karagianni et al.

(10) Patent No.: US 8,252,728 B2
(45) Date of Patent: Aug. 28, 2012

(54) DRILLING FLUIDS COMPRISING HYDROXYLATED POLYMERS

(75) Inventors: Karine Karagianni, Paris (FR); Marie-Pierre Labeau, Burlington, NJ (US); Elise Deblock, Paris (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 13/326,202

(22) Filed: Dec. 14, 2011

(65) Prior Publication Data

US 2012/0085546 A1    Apr. 12, 2012

Related U.S. Application Data

(62) Division of application No. 11/922,332, filed as application No. PCT/FR2006/001358 on Jun. 15, 2006, now abandoned.

(30) Foreign Application Priority Data

Jun. 15, 2005   (FR) ..................... 05 06057

(51) Int. Cl.
- *C09K 8/22* (2006.01)
- *C09K 8/24* (2006.01)
- *C09K 8/00* (2006.01)
- *C09K 8/16* (2006.01)
- *E21B 21/00* (2006.01)

(52) U.S. Cl. ........ 507/139; 507/117; 507/140; 507/141; 507/145; 175/65

(58) Field of Classification Search ............ 507/117, 507/139, 140, 141, 145; 175/65
See application file for complete search history.

(56) References Cited

U.S. PATENT DOCUMENTS

| | | | |
|---|---|---|---|
| 3,671,502 A | | 6/1972 | Samour et al. |
| 4,447,341 A | | 5/1984 | Block |
| 4,610,305 A | * | 9/1986 | Martin et al. ........... 166/275 |
| 4,767,550 A | * | 8/1988 | Hanlon et al. .......... 507/222 |
| 4,988,450 A | | 1/1991 | Wingrave et al. |
| 5,099,930 A | | 3/1992 | Enright et al. |
| 5,362,786 A | | 11/1994 | Woodhall et al. |
| 5,626,853 A | | 5/1997 | Bara et al. |
| 5,635,458 A | | 6/1997 | Lee et al. |
| 6,020,289 A | * | 2/2000 | Dymond ............... 507/120 |

FOREIGN PATENT DOCUMENTS

| | | |
|---|---|---|
| DE | 101 22 613 C1 | 9/2002 |
| FR | 2 749 853 A1 | 12/1997 |
| GB | 2 216 574 A | 10/1989 |
| WO | WO 92/19275 A2 | 11/1992 |

* cited by examiner

*Primary Examiner* — Ling Choi
*Assistant Examiner* — Aiqun Li
(74) *Attorney, Agent, or Firm* — SNR Denton US LLP

(57) ABSTRACT

Drilling fluids comprising polymers containing hydroxylated structural units are useful as accretion inhibiting agents, and/or as fluid rheology controlling agents, and/or as filtrate reducing agents, and/or as lubricating agents.

11 Claims, No Drawings

DRILLING FLUIDS COMPRISING HYDROXYLATED POLYMERS

CROSS-REFERENCE TO PRIORITY/PCT APPLICATIONS

This application is a divisional of U.S. application Ser. No. 11/922,332, filed Dec. 17, 2007, which is a National stage of PCT/FR 2006/001358, filed Jun. 15, 2006 and designating the United States (published in the French language on Dec. 21, 2006, as WO 2006/134273 A1; the title and abstract were published in English), which claims priority under 35 U.S.C. §119 of FR 05/06057, filed Jun. 15, 2005, and each hereby expressly incorporated by reference in its entirety and each assigned to the assignee hereof.

During operations for the drilling of wells, in particular of wells intended to recover underground oil and/or gas fields, use is made of drilling fluids intended to lubricate, clean and cool the drilling tools and the drilling head and/or to discharge the material given off during drilling (cleared rocks). Drilling fluids are also used to clean the well. They also provide the pressure necessary to support the wall of the well before consolidation. The fluids are usually known as "drilling muds". After drilling, the walls of the well are generally consolidated with a cement material.

During drilling, the walls of the rock, in particular of water-sensitive argillaceous rocks, have a tendency to swell. Operational problems are related to these clays. The swelling can interfere with the flow of the fluid or the passage of the drilling tool. Furthermore, the swelling can lead to disintegration of the wall. This disintegration can cause irregularities in the well and can thus create points of mechanical weakness.

Furthermore, the disintegrated argillaceous material is released into the fluid and can present problems of control of the viscosity of the fluid: argillaceous materials, in the presence or absence of a high concentration of salts (brine), have a tendency to greatly increase the viscosity. This increase may be harmful: if it becomes too high, the movement of the fluid may be interfered with and the latter then no longer fulfills its functions.

Furthermore, cleared argillaceous rocks may have a tendency to aggregate together in the drilling fluid. This phenomenon is referred to as an accretion phenomenon. The accretion may interfere with the circulation of the fluids and can mechanically block the drilling head (bit-balling phenomenon).

To solve the problems of clay swelling and wall disintegration, it is known to add, to drilling fluids, polymers intended to consolidate the walls (well bore consolidation). Thus, use is commonly made, inter alia, of partially hydrolyzed polyacrylamides (PHPA). It is believed that these polymers form a polymeric film at the surface of the walls, more or less encapsulate the cleared rocks and thus inhibit the hydration and/or the disintegration of the clays. However, the performance of these polymers is limited as they have a tendency to render the fluids excessively viscous at high concentration. Furthermore, the performance of these polymers is limited under high temperature-high pressure (HTHP) drilling conditions.

Moreover, it is known that other polymers can be added to drilling fluids, for example in order to adjust their rheological properties, in particular in the presence of salts. Some studies have thus been carried out on copolymers comprising units of betaine type and often acrylamide units.

Thus, copolymers based on acrylamide and on sulfobetaines or on phosphobetaines are disclosed in the document WO 00/01746 (Institut Français du Pétrole). It is indicated in this document that these copolymers are effective as viscosifying agents and as agents for modifying the surfaces of suspended particles.

Increasingly restrictive legislation is targeted at limiting the use of polymers comprising acrylamide units. Such polymers will perhaps no longer be able to be used in some countries, sooner or later. Replacement solutions are necessary.

The document U.S. Pat. No. 5,026,490 discloses other copolymers comprising sulfobetaine units and their use as deflocculating agents for drilling muds. The document U.S. Pat. No. 6,346,588 discloses other copolymers comprising sulfobetaine units, the formulation of which in a drilling fluid is facilitated. The document U.S. Pat. No. 4,607,076 discloses other copolymers comprising sulfobetaine units and their use as viscosifying agents in the presence of brine.

To solve the problems of clay swelling and wall disintegration, it is also known to add, to drilling fluids, silicates intended to consolidate the walls (well bore consolidation). The terms used are then silicate-based fluids or silicate-based muds.

However, the agents known for inhibiting swelling of clays may promote accretion. In particular, silicates have a tendency to enhance accretion phenomena. Consequently, the proposal has been made to add, to silicate-based fluids, additives targeted at limiting accretion phenomena. Thus, the document WO 99/42539 provides for the addition of small molecules exhibiting a phosphonate group and a group comprising less than 100 atoms, for example phosphonosuccinic acid. However, the performances of these additives with regard to inhibition of accretion are limited and attempts are being made to improve them.

The present invention is targeted at solving at least one of the problems mentioned above.

Thus, the present invention provides novel drilling fluids comprising a polymer, the said polymer comprising at least 65% by weight, preferably at least 90% by weight, of hydroxylated units comprising an —OH group.

Another object of the invention is to provide the use of the polymer in aqueous or nonaqueous drilling fluids, in particular in silicate-based fluids, as:
- clay-swelling inhibitor,
- filtrate-reducing agent, and/or
- accretion-inhibiting agent (in particular inhibition of bit-balling phenomena), and/or
- fluid-rheology-controlling agent, and/or
- lubricating agent.

Another subject matter of the invention is a drilling process in which use is made of a drilling fluid comprising the polymer.

The polymer can in particular be used as 2-in-1 or more agents, fulfilling several of the functions mentioned above, for example as accretion-inhibiting agent and lubricating agent.

The invention relates more particularly to a drilling fluid for oil and/or gas wells comprising the polymer. The fluid can in particular be a silicate-based fluid.

Polymer

The polymer used in the drilling fluid comprises at least 65% by weight of hydroxylated units. It preferably comprises at least 90% by weight and more preferably still at least 95% by weight of such units. According to a preferred form, the polymer is a homopolymer not comprising (0% by weight or at most 1% by weight) units other than the hydroxylated units.

Unless otherwise indicated, when the term "molar mass" will be used, the reference will be to the absolute weight-average molar mass, expressed in g/mol. The latter can be determined by aqueous gel permeation chromatography (GPC), by light scattering (DDL or also MALLS), with an aqueous eluent or an organic eluent (for example, dimethylacetamide, dimethylformamide, and the like), depending on the composition of the polymer.

In the present patent application, the term "unit deriving from a monomer" denotes a unit which can be obtained directly from said monomer by polymerization. Thus, for example, a unit deriving from an acrylic or methacrylic acid ester does not include a unit of formula —CH$_2$—CH(COOH)—, —CH$_2$—C(CH$_3$)(COOH)— or —CH$_2$—CH(OH)—, respectively, for example obtained by polymerizing an acrylic acid ester, a methacrylic acid ester or vinyl acetate respectively, and then hydrolyzing. A unit deriving from acrylic or methacrylic acid includes, for example, a unit obtained by polymerizing a monomer (for example, an acrylic or methacrylic acid ester) and by then reacting the polymer obtained (for example by hydrolysis), so as to obtain units of formula —CH$_2$—CH(COOH)— or —CH$_2$—C(CH$_3$)(COOH)—. A unit deriving from a vinyl alcohol includes, for example, a unit obtained by polymerizing a monomer (for example a vinyl ester) and by then reacting the polymer obtained (for example by hydrolysis), so as to obtain units of formula

—CH$_2$—CH(OH)—.

According to a first embodiment, the hydroxylated units are units of following formula:

in which:

R$^6$ is a hydrogen atom or a methyl group,

X$^2$ is a group of formula —CO—O—, —CO—NH— or —C$_6$H$_4$—CH$_2$—,

R$^8$ is a hydrocarbon group of at least two carbon atoms comprising at least two —OH groups, preferably on two consecutive carbon atoms.

Such units can be chosen in particular from the units of following formulae:

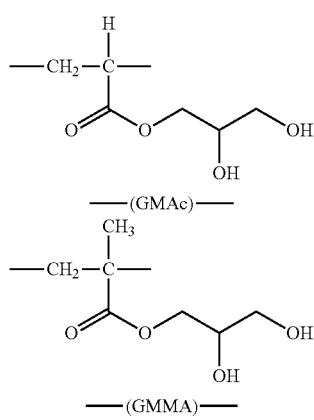

Mention may be made, as examples of monomers resulting in such units after (co)polymerization, of glycerol monoacrylate (GMAc) or glycerol monomethacrylate (GMMA, sold by Röhm):

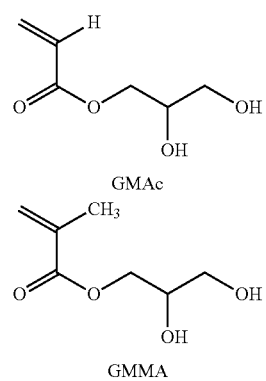

The hydroxylated units can also be obtained by chemical modification of a precursor polymer comprising, for example, epoxy units:

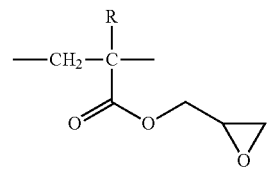

where R is a hydrogen atom or a methyl group.

Mention may be made, as examples of monomers resulting in such units after polymerization, of glycidyl acrylate (GA) or glycidyl methacrylate (GMA):

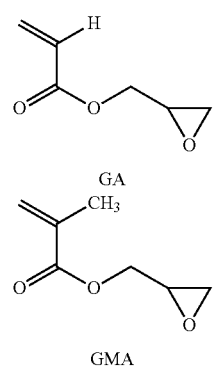

It is also possible to proceed by esterification or transesterification of a polymer of acrylic acid or of methacrylic acid with glycerol.

Use may in particular be made of a homopolymer of GMMA, polyGMMA (CAS 28474-30-8) or glyceryl polymethacrylate. Such a polymer is in particular sold by Guardian under the name Lubragel BP.

Alternatively, use may be made of a homopolymer of GMAc, polyGMAc or glyceryl polyacrylate. Such a polymer is in particular sold by Cognis under the name Hispagel.

According to a second embodiment, the hydroxylated units are units of following formula:

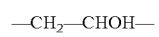

According to this embodiment, the polymer is a polymer based on polyvinyl alcohol.

The weight-average molar mass of the polymer is preferably between 1000 g/mol and 400000 g/mol (relative value, calibrated in aqueous GPC with poly(ethylene oxide) standards), preferably between 2000 g/mol and 20000 g/mol. The absolute weight-average molar mass can preferably be between 2000 and 4000000 g/mol.

Drilling Fluid

It can be an aqueous or nonaqueous fluid. It can be a silicate-based aqueous fluid (or "silicate-based mud") or silicate-free aqueous fluid. It can be a phosphate-based or phosphate-free aqueous fluid. It is preferably a silicate-based fluid.

The polymer content of the drilling fluid is advantageously between 0.1% and 10% by weight, preferably between 0.1% and 5% by weight and more preferably still between 1% and 3% by weight.

A brief description of drilling operations is given below.

The drilling operations consist in excavating a hole using a bit, made in particular of tungsten carbide, attached to hollow pipes screwed end to end. Generally, mud, or drilling fluid, comprising additives in a liquid vehicle is injected into the string of pipes. This mud subsequently comes back up via the borehole, outside the pipes, and carries along rock components detached during the drilling operation. At the same time, the rock-laden mud establishes a counterpressure which consolidates the hole. The mud is subsequently extracted from the drilling hole in order to be freed from the rocks which are present therein before being reinjected into the hollow drilling pipes.

Under such operating conditions, additives added to the mud confer a specific rheological behavior thereon. This is because, when it is subjected to very high shear stresses and high temperatures, as is the case in the bit, the fluid has to have a sufficiently low viscosity to facilitate the discharge thereof towards the outside of the hollow pipes. In contrast, the same fluid, laden with rocks, has to exhibit a high viscosity in order to keep in suspension the cuttings entrained during the drilling.

Drilling fluids (mud) are known to a person skilled in the art. The exact composition of the fluid can depend on the destination of the fluid. It can depend in particular on the temperatures and pressures to which the fluid will be subjected, on the nature of the rocks through which the well passes and on the nature of the drilling equipment.

Drilling fluids generally comprise a liquid vehicle and additives dissolved or dispersed in the liquid vehicle. Well bore consolidation agents and filtrate-reducing agents are such additives.

The liquid vehicle can be water (the drilling fluid being a water-based composition comprising additives dissolved or dispersed in water). In this case, the term "water mud" is often used. It should be mentioned that the water is often seawater. According to a specific form, the liquid vehicle is a silicate-based vehicle ("silicate-based mud"). Silicate-based muds are a category of water muds comprising silicates. They are known to a person skilled in the art. These muds are highly effective in terms of protecting water-sensitive clays, they are not very expensive and are regarded as having a low impact on the environment. They are capable of blocking fissures in clays with a size from a few nanometers up to tens of micrometers. Nevertheless, they have disadvantages in terms of the accretion of the cuttings and blocking of the drilling heads (bit-balling). Another disadvantage is the high operational pH (approximately 12), which causes risks in terms of safety of the working conditions and/or of impact on the environment, as well as poor lubrication. Liquid sodium or potassium silicates are solutions of water-soluble glasses with the chemical formula $M_2O_n(SiO_2)$, where M can be Na+ or K+ and n is the molar ratio (the number of $SiO_2$ molecules per one $M_2O$ molecule). n preferably varies from 1.5 to 3.3 for commercial products. In drilling fluids, the ratio 2.0 is typically used. It is believed that the silicates protect water-sensitive native clays from invasion by water via two mechanisms:

gelling: the fluid in the pores of the clays has a pH just about neutral. When the silicate oligomers are brought to this pH, they polymerize and form three-dimensional networks.

precipitation: the fluid in the pores of the clays comprises $Ca^{2+}$ and $Mg^{2+}$ cations which interact with the silicate oligomers to form insoluble precipitates.

The liquid vehicle can also be a water-in-oil emulsion. In this case, the term "oil mud" is often used. The latter are more expensive than water muds but may be preferred in the case of the drilling of very deep wells (HPHT (high pressure high temperature) conditions). The polymer can be used with both types of vehicles. However, water-based vehicles (water mud) are preferred, in particular silicate-based vehicles (silicate-based mud).

The polymer can participate in the composition of the drilling fluid by replacing or by complementing a well bore consolidation agent and/or filtrate-reducing agents and/or lubricating agents and/or accretion-inhibiting agents.

Mention should be made, among the additives which can be included in drilling fluids, in addition to well bore consolidation agents and/or filtrate-reducing agents, of:

agents for controlling the rheology: they can be agents which render the fluid viscoelastic, shear-thinning agents or thickening agents. Mention should be made, for example, of polysaccharides, such as guar gum or starch, xanthan gums and derivatives of these compounds.

agents for controlling the ionic strength of the fluid. They are, for example, salts.

emulsifiers, in particular in oil muds, for example the emulsifiers disclosed in patent application WO 01/94495.

dispersants.

scale inhibitors, for example polymers comprising units derived from acrylic acid or from vinylsulfonic acid or from vinylphosphonic acid.

agents for controlling the density of the fluid, for example barium sulfate.

oxygen scavengers and/or other chemical stabilizers.

However, further details with regard to certain compounds which can participate in the composition of drilling fluids are given below.

Drilling fluids can comprise polyphosphates, tannins, lignosulfonates, lignin derivatives, peats and lignites, polyacrylates or polynaphthalenesulfonates, alone or as a mixture.

The amount of thinning agent or dispersant can vary. By way of indication, this amount can be between 0 and 1%, with respect to the total weight of the fluid.

The drilling fluid according to the invention can additionally comprise an oxygen scavenger. The object of this type of additive is to scavenge the oxygen present in the drilling muds, which can bring about decomposition of certain additives.

Mention may be made, among the products of this type, for example, of hydroxylamines, hydrazine, sulfites, bisulfites, dithionites or borohydrides.

According to a specific embodiment, hydrazine is used as oxygen scavenger as it does not bring about the formation of insoluble precipitates which promote the appearance of blockages in the well. The hydrazine may be in anhydrous or hydrated form, in the form of salts, such as, for example, the chloride or sulfate, or also in the carbohydrazide form.

Generally, the content of additive of this type varies between 0 and 0.25%.

The drilling fluid according to the invention can furthermore comprise at least one weighting compound and/or at least one inorganic colloid.

The weighting components contribute to maintaining a sufficient hydrostatic pressure in the well and to keeping in suspension the rocks entrained during the drilling operation. Such compounds are conventionally chosen from the abovementioned soluble salts and from salts of low or very low solubility. Mention may be made, among salts of low solubility, without intending to be restricted thereto, of alkaline earth metal sulfates, silicates or carbonates, such as barium sulfate or calcium carbonate.

Use may likewise be made of alkaline earth metal or zinc bromides, such as potassium bromide or zinc bromide. Use may also be made of iron oxides or sulfide or subarsenate. Use may also be made of strontium sulfate, indeed even, in some cases of high density, of galene (lead sulfide).

Inorganic colloids, which are compounds substantially insoluble under the conditions of use of the fluid according to the invention are agents which modify the rheology of the medium and which make it possible to keep the cuttings in suspension in the latter. Attapulgite, barite or bentonite, alone or as a mixture, are the most commonly used examples thereof. It should be noted that, if use is made of a fluid comprising an inorganic colloid, the latter will preferably be attapulgite.

The contents of weighting compounds and of inorganic colloids depend on several factors which are not solely technical. This is because, while these contents are very clearly determined according to the nature of the ground through which the well passes, the scale of the cost generated by the use of these additives is taken into account (presence or not on the spot, cost and the like).

Very often, and still with the aim of minimizing the expenses incurred, the preparation of the drilling fluid is carried out with the water present on the drilling site. Thus, it is not uncommon to have available formation water (in contrast to composition water types, that is to say to water types prepared for a specific purpose) laden with salts, such as seawater, briny water types or hard water types. In this case, the content of salts in the water employed varies according to the provenance of the latter.

However, it may happen that the water available is unladen water or water which is not significantly laden. In this case, it may be appropriate to add salts, such as chlorides, for example.

It is also possible, if necessary, to add inorganic salts in order to promote the precipitation of certain ions, if they are present, in particular divalent ions. Mention may be made, for example, of the addition of sodium carbonate, in order to precipitate calcium, or sodium bicarbonate, in order to precipitate lime, in particular during redrilling operations in cement. Mention may also be made of the addition of gypsum or calcium chloride, in order to limit the swelling of clays, or the addition of calcium hydroxide or slate lime, in order to remove bicarbonates from muds contaminated by carbon dioxide.

Here again, the content of salts depends on the rocks through which the well passes and on the water types available on the operating site and the operations can be carried out in the presence of fluids saturated with salts.

Very clearly, the drilling fluid according to the present invention can comprise standard additives from the category of high-molecular-weight polysaccharides, such as succinoglycan, wellan or gellan, of use as viscosifying agents.

Other additives which are conventional in applications relating to the exploitation of oil fields can participate in the composition of the fluid. Thus, mention may be made of agents for the transfer of free radicals, such as lower alcohols, thioureas or hydroquinone, biocides, chelating agents, surfactants, antifoaming agents or corrosion inhibitors, for example.

Effects

Clay-Swelling Inhibitor

During the drilling of wells, in particular during the drilling of wells intended for the recovery of oil and/or gas, drilling is often carried out through argillaceous rocks, in particular through shales. These rocks have a tendency to swell on contact with the drilling fluids, in particular on contact with aqueous fluids. The swelling is a consequence of penetration of the fluid into the rocks. Such swelling presents several problems. Swelling along the walls of the well creates protuberances which interfere with the movement of the drilling fluid and of the drilling tools. Moreover, swelling can result in disintegration, creating bumps along the walls. These bumps and protuberances can create points of mechanical weakness in the well. The disintegrated material is composed of fine platelets which can detrimentally affect the rheological properties of the fluid, and thus interfere with its movement.

A clay-swelling inhibitor is targeted at preventing the penetration of the fluid into the rocks along the walls, and inhibiting the swelling and/or the disintegration. Well bore consolidation may be concerned.

The cleared argillaceous rocks, in particular the shales, in suspension in the fluids can present problems. These suspended rocks may swell, break up, and thus modify the rheological properties of the fluids, as explained above. A clay-swelling inhibitor is targeted at preventing the penetration of the water into the suspended cleared rocks and/or inhibiting the disintegration.

Accretion-Inhibiting Agent

Furthermore, the suspended rocks have a tendency to aggregate together. The term used is accretion. The aggregates formed can interfere with the movement of the fluid and tools. Furthermore, they can surround the drilling head and thus block it (bit-balling phenomenon). An accretion-inhibiting agent for cleared drilled rocks is targeted at preventing these phenomena. It should be noted that a conventional agent can form a film or be adsorbed at the surface of cleared rocks without, however, preventing their agglomeration (accretion). A poorly suited clay-swelling inhibitor can even promote this accretion. This is the case with silicates, for example. There exist requirements for accretion-inhibiting agents.

Filtrate-Reducing Agent

Filtrate reduction is the avoidance of loss of fluid in the well by infiltration into the rocks. Loss of fluid is to be avoided for economic reasons (cost of the fluid), for safety reasons and for productivity reasons. This is because, if the fluid should be lacking, the drilling tools may be damaged, because of overheating, poor lubrication or mechanical blocking by poorly discharged rocks, and require temporary shutdown of the drilling operation.

The polymers can in particular be used as 2-in-1 agents, or higher value agents, combining several functions chosen from the following:

clay-swelling inhibition and/or well bore consolidation, inhibition of accretion and/or inhibition of the blocking of drilling heads (bit-balling inhibition), lubrication, filtrate reduction.

Uses as 2-in-1 agents simplify technically and economically the formulations of the fluids. Uses as accretion-inhibiting agents and lubricating agents are particularly advantageous.

Uses

In the context of the use according to the invention, the drilling fluid is preferably a fluid for the drilling of a well intended for the recovery of oil and/or gas. The polymer content of the drilling fluid is advantageously between 0.1% and 10% by weight, preferably between 0.1% and 5% by weight and more preferably still between 1% and 3% by weight.

In the context of the use according to the invention, the polymer is an accretion-inhibiting agent for cleared drilled rocks.

In the context of the use, the polymer can be, also or alternatively, a lubricating agent.

Other details or advantages of the invention will become more clearly apparent in the light of the examples below, without a limiting nature.

EXAMPLES

In the examples which follow, the following additive is used:

| | |
|---|---|
| Additive 1 | GMMA homopolymer with a weight-average molecular weight of approximately 5600 g/mol |

Example 1

Fluid Comprising a Polymer

A silicate-based drilling mud formulation B is prepared which comprises the following ingredients:

| | |
|---|---|
| Brine | 20% |
| Antifoaming agent (Bevaloid 6092) | 0.1% |
| Thickening agent, xanthan gum (Rhodopol 23P, Rhodia) | 0.5% |
| Silicates (Silicate 60N20, Rhodia) | 5% (dry matter) |
| Additive 1 | 1% |

KOH or NaOH, in order to adjust the pH to 12.

The invention claimed is:

1. A drilling process comprising injecting a drilling fluid into a hole during drilling, said drilling fluid comprising a polymer and a liquid vehicle, optionally comprising an additive dissolved or dispersed in the liquid vehicle, said polymer having at least 65% by weight of hydroxylated structural units having the formula:

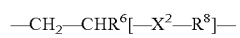

in which:
R$^6$ is a hydrogen atom or a methyl radical,
X$^2$ is a group of formula —CO—O—, —CO—NH— or —C$_6$H$_4$—CH$_2$—,
R$^8$ is a hydrocarbon group of at least two carbon atoms comprising at least two —OH groups, optionally on two consecutive carbon atoms.

2. The process as defined by claim 1, wherein said drilling fluid comprises from 0.1% to 10% by weight of said polymer.

3. The process as defined by claim 2, wherein said drilling fluid comprises from 0.1% to 5% by weight of said polymer.

4. The process as defined by claim 2, wherein said drilling fluid comprises from 1% to 3% by weight of said polymer.

5. The process as defined by claim 1, wherein the liquid vehicle comprises an aqueous silicate-based fluid.

6. The process as defined by claim 1, said polymer having at least 90% by weight of said hydroxylated structural units.

7. The process as defined by claim 1, wherein said polymer comprises a homopolymer devoid of units other than the hydroxylated structural units.

8. The process as defined by claim 1, said polymer having a weight-average molecular weight of from 1,000 g/mol to 400,000 g/mol, measured by GPC calibrated with poly(ethylene oxide) standards.

9. The process as defined by claim 8, said polymer having a weight-average molecular weight of from 2,000 g/mol to 20,000 g/mol.

10. The process as defined by claim 1, further comprising the step of recovering of oil and/or gas.

11. The process as defined by claim 1, wherein the injected drilling fluid provides one or more of the following: inhibits clay-swelling, consolidates formation of a well bore, inhibits accretion, controls fluid-rheology, reduces filtrate and lubricates.

* * * * *

UNITED STATES PATENT AND TRADEMARK OFFICE
CERTIFICATE OF CORRECTION

PATENT NO. : 8,252,728 B2
APPLICATION NO. : 13/326202
DATED : August 28, 2012
INVENTOR(S) : Katerina Karagianni, Marie-Pierre Labeau and Elise Deblock It is certified that error appears in the above-identified patent and that said Letters Patent is hereby corrected as shown below:

Title Page, Section 75 (Inventors:) please change "Karine Karagianni" to --Katerina Karagianni--.

Signed and Sealed this
Fifth Day of February, 2013

Teresa Stanek Rea
*Acting Director of the United States Patent and Trademark Office*